United States Patent [19]

Burda

[11] Patent Number: 4,926,449
[45] Date of Patent: May 15, 1990

[54] CORROSION INHIBITION OF CLOSED COOLING WATER AUXILIARY SYSTEM FOR NUCLEAR POWER PLANTS

[76] Inventor: Paul A. Burda, 213 Westvale Ct., San Ramon, Calif. 94583

[21] Appl. No.: 158,613

[22] Filed: Feb. 22, 1988

[51] Int. Cl.$^5$ .......................... C09K 3/00; G21C 19/28
[52] U.S. Cl. ...................................... 376/306; 252/387
[58] Field of Search ........................... 252/387; 422/19; 376/306, 305

[56] References Cited

U.S. PATENT DOCUMENTS

| | | | |
|---|---|---|---|
| 4,313,837 | 2/1982 | Vukasovich et al. | 252/387 |
| 4,349,457 | 9/1982 | Orillion | 252/387 |
| 4,663,053 | 5/1987 | Geiger | 252/389.21 |
| 4,717,495 | 1/1988 | Hercamp et al. | 252/387 |
| 4,728,452 | 3/1988 | Hansen | 252/387 |

*Primary Examiner*—Daniel D. Wasil
*Attorney, Agent, or Firm*—Owen, Wickersham & Erickson

[57] ABSTRACT

A potassium inhibitive blend and corrosion protection method for closed cooling water systems. The closed cooling system circulates about 35 to 40 gallons of corrosion inhibitor per 10,000 gallons of circulating water. The corrosion inhibitor contains potassium molybdate, potassium nitrite, and potassium borate in an aqueous solution so that if leakage of the circulated water occurs, the leaked corrosion inhibitive liquid does not cause dangerous radiation in any amounts dangerous to the environment. The potassium molybdate and potassium nitrate each constitute about 12% of the aqueous solution. Potassium based borate at 2 to 2.5%, ethylene glycol preferably at about 10%, and benzotriazole or tolyltriazole of about 0.4% with up to 1% polymeric scale suppressant are also included in the corrosion inhibitive blend.

4 Claims, 1 Drawing Sheet

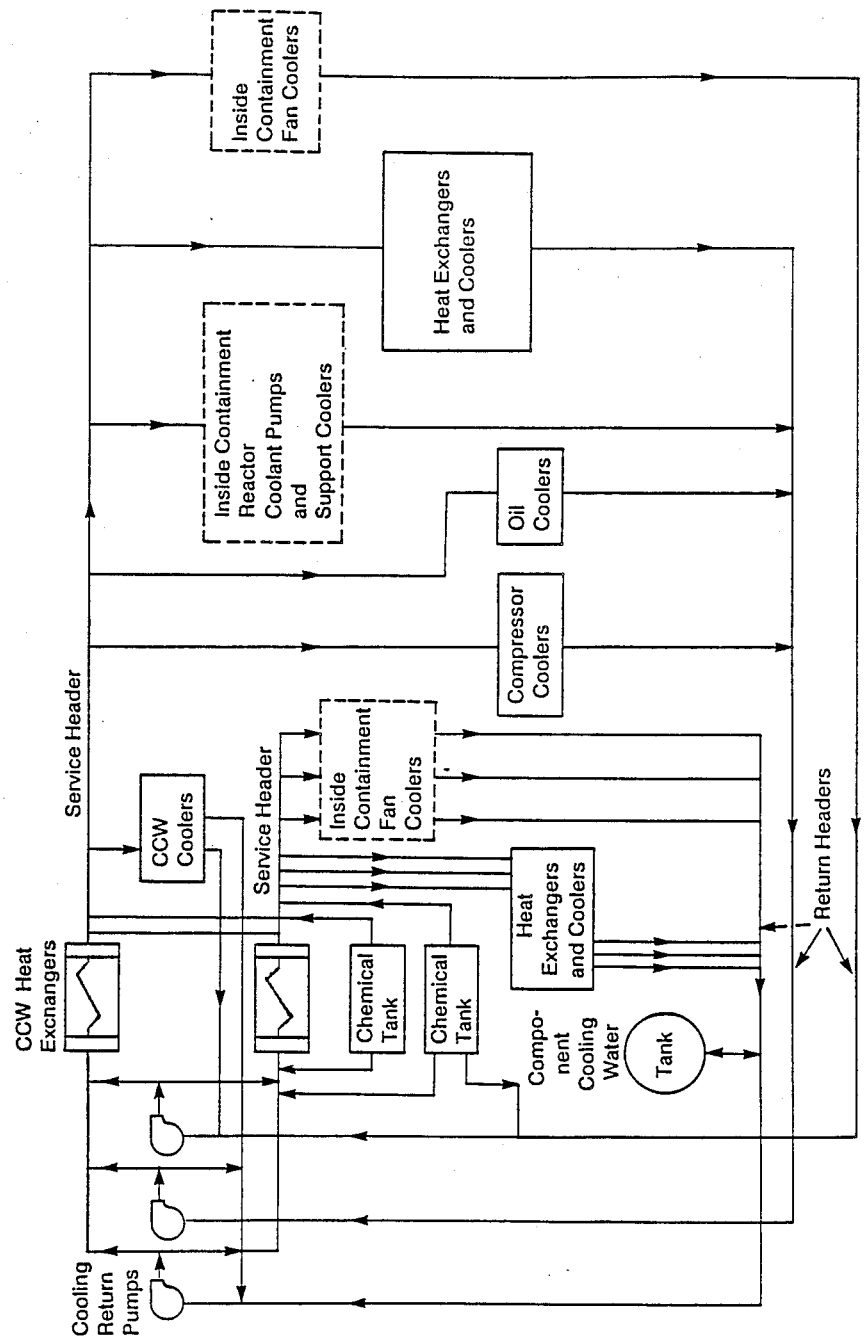

CORROSION INHIBITION OF CLOSED COOLING WATER AUXILIARY SYSTEM FOR NUCLEAR POWER PLANTS

This invention relates to inhibiting corrosion in closed cooling water systems under radiation, especially in nuclear power plants, but also in other applications.

BACKGROUND OF THE INVENTION

Closed cooling water systems are important parts of power plants and other industrial systems. These systems have traditionally employed chromates for their corrosion protection. Concern about toxicity of chromates and their ecological effects had led to a consideration of the use of other anodic inhibitors such as sodium molybdates. Sodium molybdates are compatible with all the widely used biocides/polymers, scale suppressants, and sludge control agents. Therefore they are used as a part of multicompositional products (blends) along with HEDP (1-hydroxy-ethylidene-1, 1-disphonic acid), MPT (2-mercapto-benzothiazole), tolyltriazole, benzotriazole, nitrites, sodium hydroxide, pH chelants etc. to prevent corrosion of materials. See Burda, P. A., Proceedings of an International Symposium, "Surfaces, Inhibition and Passivation," The Electrochemical Society, Volume 86-7, Pages 91-103 (1986).

These molybdate-based blends are much lower in toxicity than the chromates. Some of these blends have been found to be as effective as chromates for corrosion protection of mild and cast steels, cast iron and copper alloys in deionized and nonpotable water.

However, it has been discovered in closed cooling water auxiliary systems of nuclear plants that such sodium molybdate based blends tend to produce sodium radioactive isotopes in the presence of radiation and flux of neutrons, causing contamination of cooling systems. Thus, sodium molybdate and all chemicals incorporating substantial amounts of sodium have become unsatisfactory for nuclear application.

An object of the present invention is to provide an improved closed cooling water system which can operate safely under radiation conditions.

SUMMARY OF THE INVENTION

The present invention rests on the discovery that, although sodium and potassium are often considered to be equivalent metals and ions, that is not true in the case of nuclear systems. The surprising result has been obtained that potassium molybdate can replace sodium molybdate without resulting in any significant production of dangerous radioactivity. The new potassium-based corrosion inhibitive blend may also include, potassium nitrite and other materials used in other blends before, such as ethylene glycol, benzotriazole, tolyltriazole, and polymers, for scale suppression.

BRIEF DESCRIPTION OF THE DRAWINGS

The drawing is a schematic view or flow sheet of a component cooling water system embodying the principles of the invention.

DETAILED DESCRIPTION OF THE INVENTION

Laboratory and field tests have revealed that sodium-molybdate-based blends could successfully replace chromate corrosion inhibitors in closed cooling water systems, including those in power plants. It was, however, found that in nuclear applications, radioactive sodium isotopes, especially $Na^{24}$, were produced, causing closed cooling water auxiliary systems to be dangerously radioactive and hazardous to health in case of leakages or repairs.

Therefore, in a preferred closed cooling water system for each 10,000 gal. water, 35 to 40 gallons of the following mixture may be used for corrosion protection of materials:

Potassium molybdate ($K_2MoO_4$): 12%
Potassium nitrate ($KNO_2$) up to: 12%
Potassium borate ($K_2B_4O_7 \cdot 5H_2O$): 2-2.5%
Ethylene glycol: 10%
Benzotriazole or tolyltriazole: 0.4%
Polymeric scale suppressant: up to 1%
DI water: Remainder.

Since absolute purity is nearly impossible to attain and is impractical, there may be some sodium present, but this can be kept under 160 ppm. There may be also up to 10 ppm of chloride (as $Cl^-$) and up to 10 ppm of fluoride (as $F^-$), allowing less than 0.05 ppm of $Cl^-$ and $F^-$ and less than 0.6 ppm of Na in the closed cooling water system.

The effectiveness of the potassium molybdate system on toxicity is about the same as that of sodium molybdate and is far better than that of chromates, as shown in the following table:

TABLE 1

| | Acute Toxicity Data for CHROMATES, Sodium Molybdate and Potassium Molybdate Based Blends | | | | | | | | | | | |
|---|---|---|---|---|---|---|---|---|---|---|---|---|
| | Chromate (as $CrO_4$) | | | | Sodium Molybdate based blend ppm | | | | Potassium Molybdate based blend ppm | | | |
| | TL50 (hours)* | | | | TL50 (hours)* | | | | TL50 (hours)* | | | |
| Species | 24 | 48 | 96 | No Effect | 24 | 48 | 96 | No Effect | 24 | 48 | 96 | No Effect |
| Fathead minnow | 100 | 75 | 50 | <50 | >5000 | 5000 | 1000 | 500 | >5000 | >5000 | 1500 | 500 |
| Treespine Stickleback | 50 | <50 | <<50 | <<50 | 3000 | 1500 | 1000 | <500 | 3000 | 1500 | 1250 | 500 |

*TL50 = LC50 - Threshold limit at which a particular effect occurs in 50 percent of the population survived. Brown & Caldwell Inc., Analytical service reports for Pacific Gas and Electric Co., 11/11/85, 12/23/85, 3/17.86.

Tests made with potassium based chromate as a corrosion inhibitor in auxiliary closed cooling water systems revealed that there was no secondary radiation detected in the presence of potassium. Based on calculations of radiation levels, potassium in potassium molybdate causes thirteen times lower radiation than sodium; so the radiation level caused by the presence of less than 0.6 ppm of Na has an insignificant effect on the radioactivity of the cooling system. Also, the concentration of chlorides and fluorides is below the 0.15 ppm level permitted by Nuclear Operating Procedures for Chemistry Control limits in nuclear plants. Pacific Gas and Electric Gas Co., Department of Nuclear Plant Operations, Diablo Canyon Power Plant, Chemistry Control Limits and Action Guidelines for the Plant Support Systems, N° OP F-5: 111, 1/28/84.

The buildup of significant amounts of radioactive isotopes in this corrosion inhibitor has been found to be, for practical purposes, substantially eliminated.

It has been found that this inhibitive blend, kept practically without sodium, will not produce secondary radiation in any significant amount, and at the same time results in prevention of corrosion in nuclear power plant auxiliary and/or other closed cooling water systems.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. In a nuclear power plant cooling water system having a liquid corrosion inhibitor, said inhibitor corrosion under radiation containing potassium molybdate, potassium nitrite, and potassium borate and containing less than 160 ppm sodium ions.

2. The liquid inhibitor of claim 1 also containing practically sodium-free ethylene glycol and benzotriazole or tolyltriazole and/or scaling retardant.

3. In a nuclear power plant cooling system having a liquid corrosion inhibitor, said inhibitor containing about 12% potassium molybdate and about 12% potassium nitrite and 2 to 2.5% potassium borate in aqueous solution and containing less than 160 ppm sodium ions.

4. The liquid inhibitor of claim 3 also containing about 10% ethylene glycol and about 0.4% of benzotriazole or tolyltriazole respectively and up to 1% polymeric potassium based scaling retardant.

* * * * *

UNITED STATES PATENT AND TRADEMARK OFFICE
CERTIFICATE OF CORRECTION

PATENT NO. : 4,926,449
DATED : May 15, 1990
INVENTOR(S) : Burda, Paul A.

It is certified that error appears in the above-identified patent and that said Letters Patent is hereby corrected as shown below:

Column 3, line 3
  "No" should read --N$^O$--.

Column 4, lines 2 and 3, delete "corrosion under radiation".

Column 4, line 10, "cooling system" should read --cooling water system--.

Signed and Sealed this

Thirteenth Day of October, 1992

*Attest:*

DOUGLAS B. COMER

*Attesting Officer*     *Acting Commissioner of Patents and Trademarks*